United States Patent
Yerramalli et al.

(10) Patent No.: US 11,917,574 B2
(45) Date of Patent: Feb. 27, 2024

(54) POSITIONING IN SCELL DORMANCY STATE

(71) Applicant: QUALCOMM Incorporated, San Diego, CA (US)

(72) Inventors: Srinivas Yerramalli, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/463,798

(22) Filed: Sep. 1, 2021

(65) Prior Publication Data

US 2023/0068355 A1 Mar. 2, 2023

(51) Int. Cl.
*H04W 64/00* (2009.01)
*H04W 72/23* (2023.01)
*H04W 52/02* (2009.01)

(52) U.S. Cl.
CPC ..... *H04W 64/003* (2013.01); *H04W 52/0229* (2013.01); *H04W 72/23* (2023.01)

(58) Field of Classification Search
CPC .......... H04W 64/003; H04W 52/0229; H04W 72/23; H04W 64/006; H04W 76/15; H04W 76/28; H04W 52/0219; H04W 52/028; H04W 52/0216; H04W 76/27; H04W 88/02; H04W 88/08; G01S 5/10; G01S 5/0036; G01S 5/0045; G01S 5/02
USPC ...................................................... 455/456.1
See application file for complete search history.

(56) References Cited

U.S. PATENT DOCUMENTS

| 10,531,347 | B2 | 1/2020 | Han et al. | |
| 2015/0215929 | A1* | 7/2015 | Damnjanovic | H04W 72/21 370/241 |
| 2023/0164603 | A1* | 5/2023 | Seo | H04W 24/08 370/329 |

FOREIGN PATENT DOCUMENTS

| WO | 2021162960 A1 | 8/2021 |
| WO | WO-2022009160 A1 * | 1/2022 |

OTHER PUBLICATIONS

International Search Report and Written Opinion—PCT/US2022/035563—ISA/EPO—dated Nov. 3, 2022.

* cited by examiner

*Primary Examiner* — Hirdepal Singh
(74) *Attorney, Agent, or Firm* — Procopio, Cory, Hargreaves & Savitch LLP

(57) ABSTRACT

Method and apparatus for measuring downlink positioning of an SCell in a dormant state. The apparatus receives, from a base station, a dormancy state configuration of an SCell associated with the base station. The apparatus measures downlink positioning measurements associated with at least one frequency corresponding to the SCell in a dormant state based on the dormancy state configuration. The apparatus may measure downlink positioning measurements associated with at least one frequency corresponding to at least one active cell associated with the base station. The apparatus may report the downlink positioning measurements of the SCell in the dormant state to an active cell associated with the base station.

28 Claims, 11 Drawing Sheets

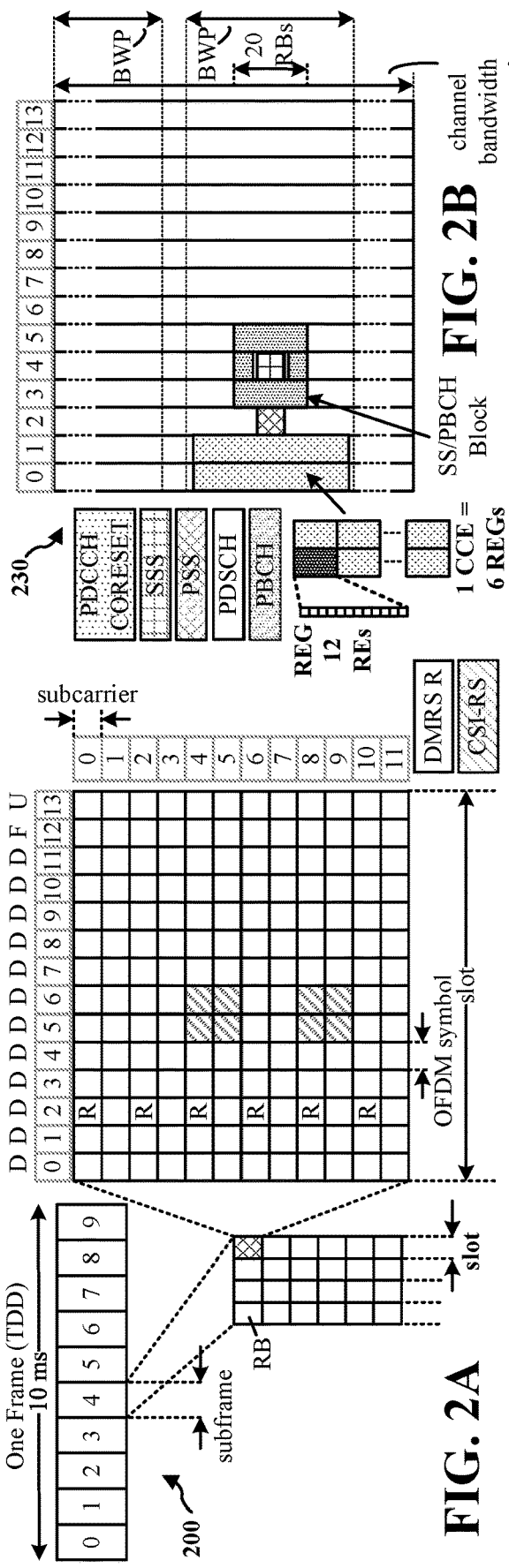
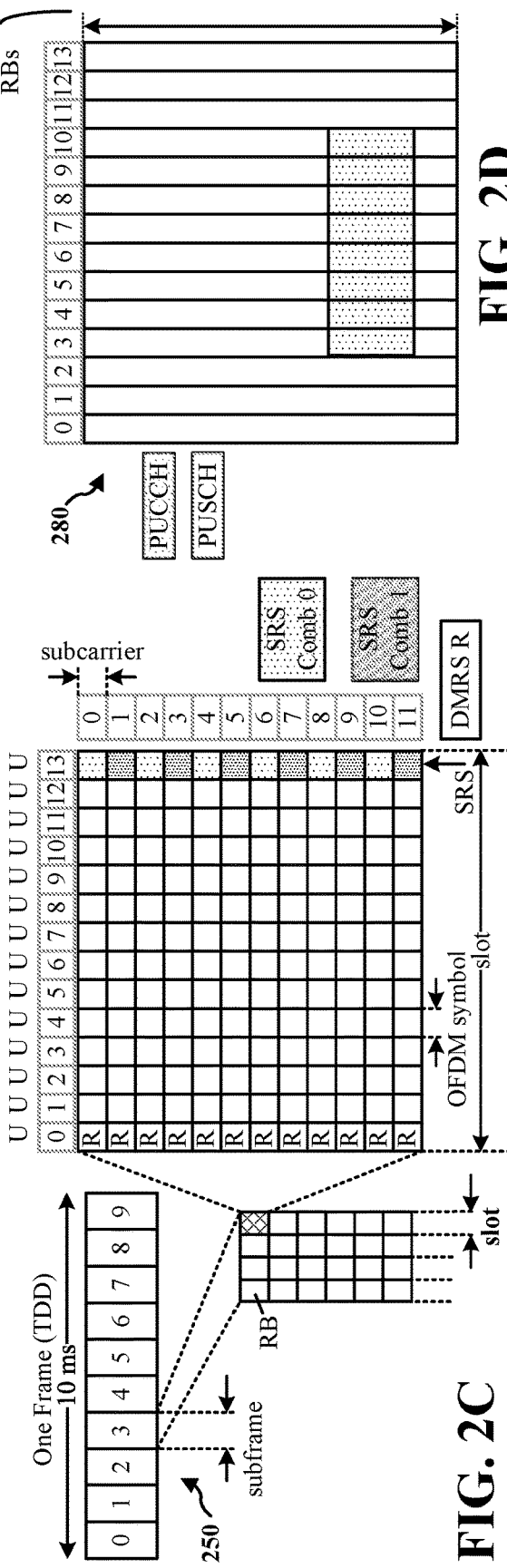
FIG. 2A  FIG. 2B  FIG. 2C  FIG. 2D

POSITIONING IN SCELL DORMANCY STATE

TECHNICAL FIELD

The present disclosure relates generally to communication systems, and more particularly, to a configuration for measuring downlink positioning of an SCell in a dormant state.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives, from a base station, a dormancy state configuration of a secondary cell (SCell) associated with the base station. The apparatus measures downlink positioning measurements associated with at least one frequency corresponding to the SCell in a dormant state based on the dormancy state configuration.

In an aspect of the disclosure, a method, a computer-readable medium, and an apparatus are provided. The apparatus may be a device at a base station. The device may be a processor and/or a modem at a base station or the base station itself. The apparatus configures a dormancy state configuration of a secondary cell (SCell) associated with the base station. The apparatus transmits, to a UE, the dormancy state configuration to configure the UE to measure downlink positioning measurements associated with at least one frequency corresponding to the SCell in a dormant state.

In an aspect of the disclosure, a method, a computer-readable medium, and an apparatus are provided. The apparatus may be a device at a base station. The device may be a processor and/or a modem at a base station or the base station itself. The apparatus receives, from a location management function (LMF), a dormancy state configuration of a secondary cell (SCell) associated with the base station. The apparatus transmits, to a UE, the dormancy state configuration received from the LMF to configure the UE to measure downlink positioning measurements associated with at least one frequency corresponding to the SCell in a dormant state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
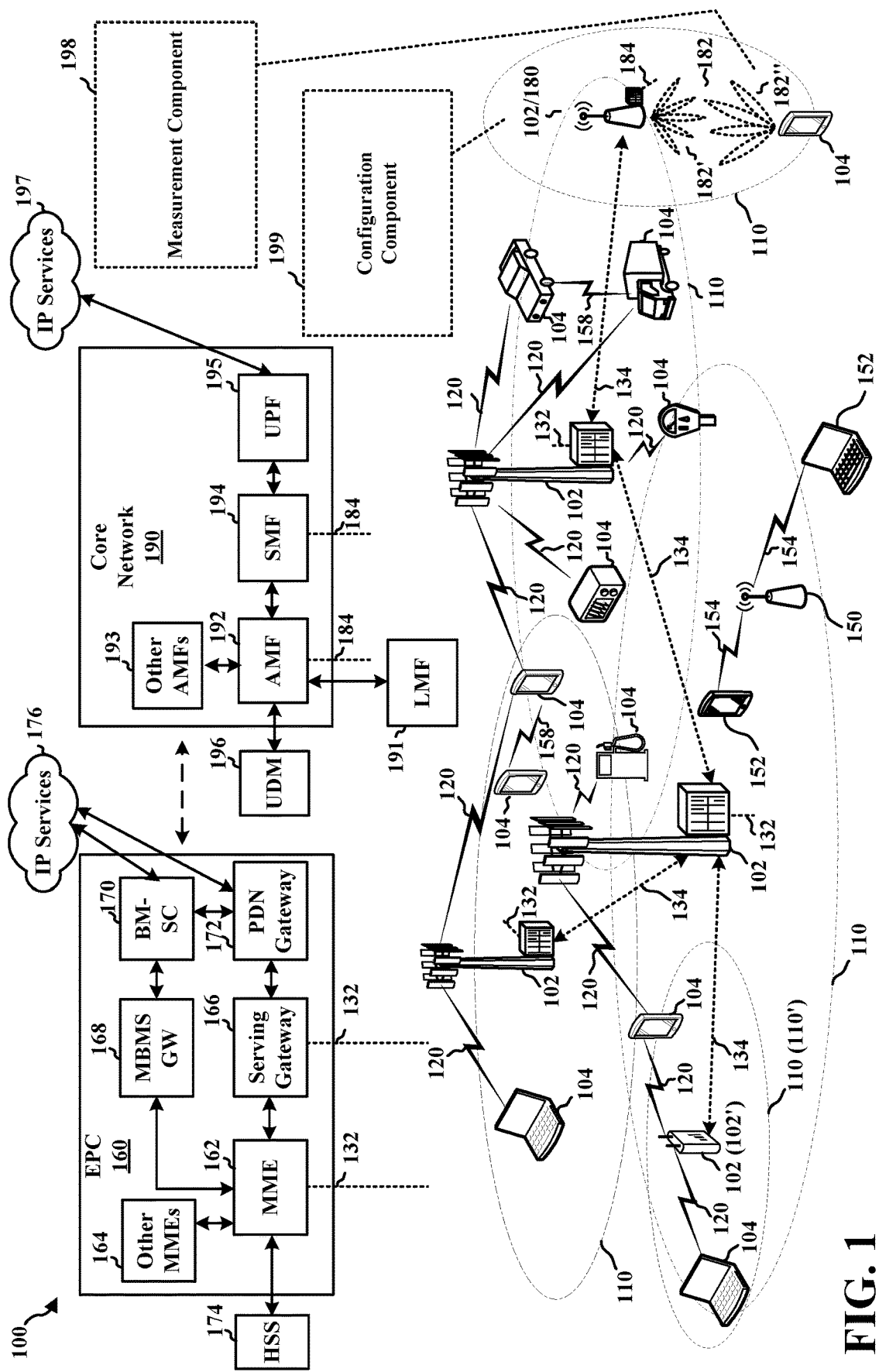
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services. In some instances, the core network 190 may communicate with a location management function (LMF) 191. The LMF may be utilized in positioning architecture. The LMF may receive measurements and assistance information from the NG-RAN and the UE 104 via the AMF 192. The LMF may utilize the measurements and assistance information to compute the position of the UE 104. The LMF may provide a positioning configuration to the UE via the AMF. In such instances, the NG-RAN (e.g., base station 102/180) receives the positioning configuration from the AMF and may then provide the positioning configuration to the UE. In some instances, the NG-RAN (e.g., base station 102/180) may configure the UE with the positioning configuration.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to monitor for positioning reference signals from a cell in a dormant state. For example, UE 104 may comprise a measurement component 198 configured to monitor for positioning reference signals from a cell in a dormant state. The UE 104 may receive, from a base station 180, a dormancy state configuration of a secondary cell (SCell) associated with the base station 180. The UE 104 may measuring downlink positioning measurements associated with at least one frequency corresponding to the SCell in a dormant state based on the dormancy state configuration.

Referring again to FIG. 1, in certain aspects, the base station 180 may be configured to configure a UE 104 to monitor for positioning reference signals from a cell in a dormant state. For example, base station 180 may comprise a configuration component 199 configured to configure a UE 104 to monitor for positioning reference signals from a cell in a dormant state. The base station 180 may configure a dormancy state configuration of a secondary cell (SCell) associated with the base station 180. The base station 180 may transmit, to a UE 104, the dormancy state configuration to configure the UE 104 to measure downlink positioning measurements associated with at least one frequency corresponding to the SCell in a dormant state.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
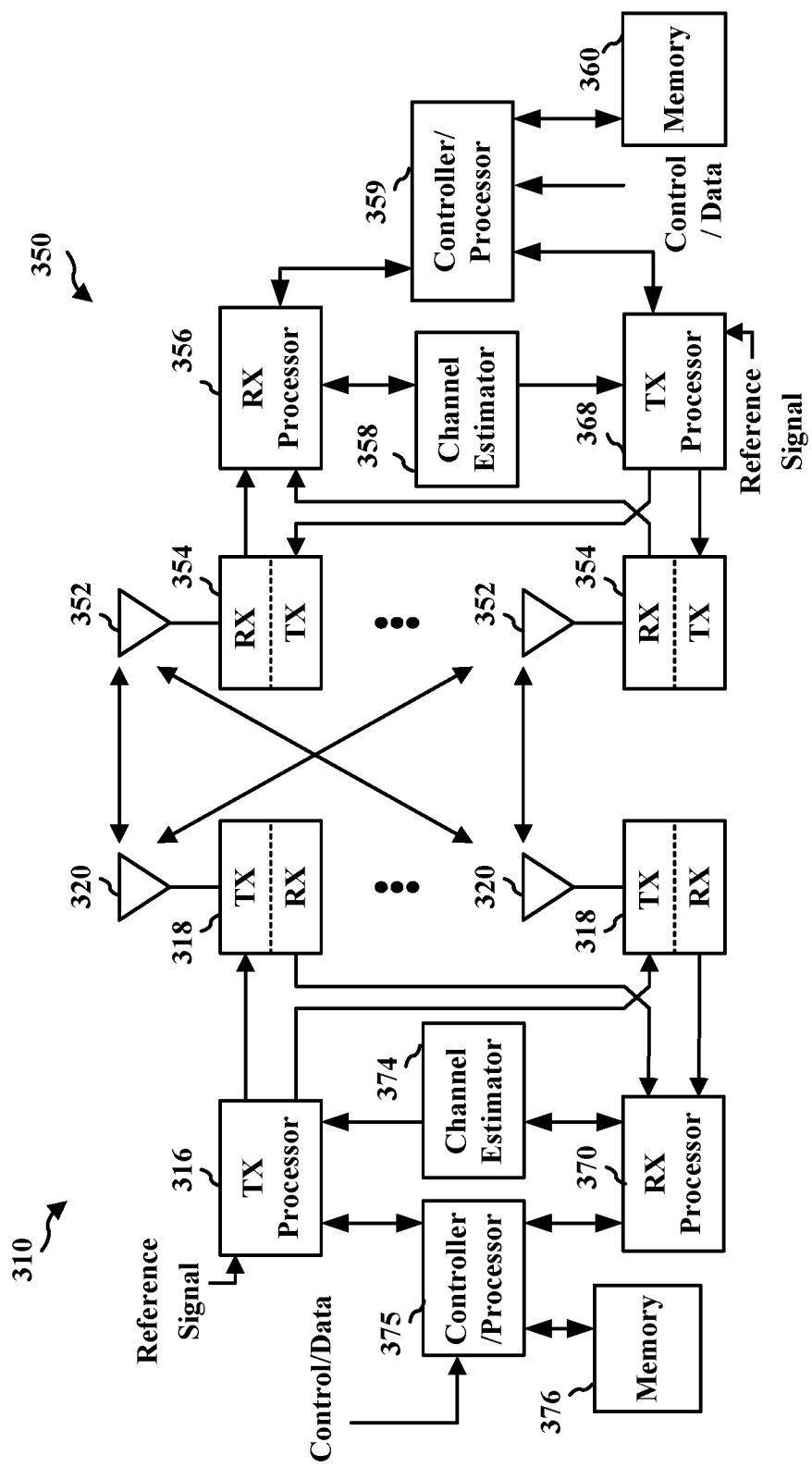
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems, such as 5G NR, an SCell associated with a base station may be configured to experience dormancy behavior, such that a UE stops monitoring PDCCH on the SCell in the dormant state but the UE may continue to perform CSI measurements, automatic gain control (AGC), and beam management, if so configured. The dormancy behavior may allow multiple carriers to remain active, and the UE may save power by not monitoring the PDCCH on the multiple carriers. The UE may continue to perform necessary measurements prior to the activation of the dormant SCell in an effort to achieve a tradeoff between activation latency and power consumption. SCell dormancy may be achieved based on a dormant bandwidth part (BWP). The dormant BWP may occur at the PHY layer. For example, an SCell dormancy indication may be sent, via a non-fallback DCI, on a PCell within a discontinuous reception (DRX) active time of the UE. In another example, the SCell dormancy indication may be sent, via wake up signal (WUS) DCI, on a PCell outside of a DRX active time of the UE.

The downlink dormancy behavior may allow the UE to stop monitoring PDCCH on the SCell but continue to perform CSI measurements, AGC, and beam management. In some instances, periodic and semi-persistent CSI reporting may be supported, while aperiodic CSI reporting may not be supported. The UE may not monitor the PDCCH for the SCell (e.g., for cross-carrier scheduling) when the scheduled SCell is in the dormant state.

Beam failure recovery (BFR) and beam failure detection (BFD) may be allowed for an SCell in a dormancy state. BFD may be configured and performed in an SCell in the dormancy state. A BFR indication in the form of a scheduling request (SR) may be sent in any available serving cells, with the exception of the dormant BWP. For beam management, the UE may only apply the transmission configuration indication (TCI) states that may be configured in a PDSCH configuration. A timer-based transition between non-dormancy and dormancy may not be supported. For example, bwp-InactivityTimer should stop, if running, when the UE enters a dormant BWP.

In uplink dormancy behavior, SRS transmission including aperiodic SRS, semi-periodic SRS, and periodic SRS may not be supported in instances where the downlink BWP is switched to a dormant BWP. The UE should stop all the uplink behavior in instances where the downlink BWP is switched to a dormant BWP, such as stopping any uplink transmission, suspend any configured uplink grant Type 1, clear any configured uplink grant of configured grant Type 2 in the SCell in the dormancy state.

As discussed above, an SCell in the dormancy state may support some functions such as, but not limited to, AGC adjustments, CSI measurements, and beam management. The PDCCH is not monitored which provides a power savings, while only periodic and semi-persistent CSI and beam related functions are supported. However, if a UE is configured with positioning on a given SCell, positioning measurement may not be performed on the given SCell in the dormancy state. In such instances, the UE would need to bring the SCell into an active state (e.g., non-dormant state).

Aspects presented herein provide a configuration for measuring downlink positioning of an SCell in a dormant state. For example, a UE may be configured with a dormancy state configuration of the SCell, such that the UE may measure downlink positioning measurements associated with at least one frequency corresponding to the SCell in the dormant state.

Figure 4:
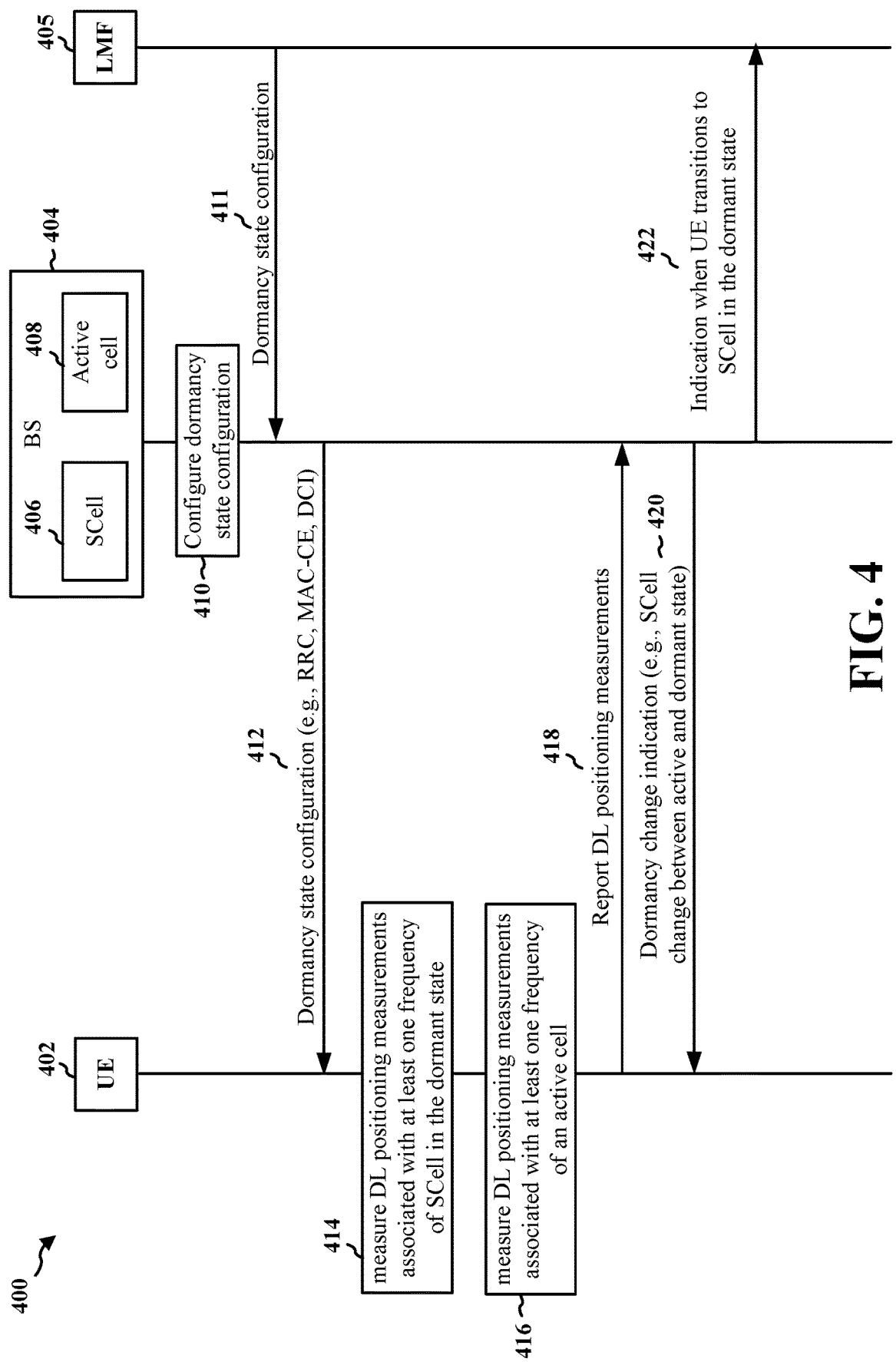
FIG. 4 is a call flow diagram of signaling between a UE and a base station.

FIG. 4 is a call flow diagram 400 of signaling between a UE 402 and a base station 404. The base station 404 may be configured to provide at least one cell (e.g., SCell 406, active cell 408). The UE 402 may be configured to communicate with the base station 404. For example, in the context of FIG. 1, the base station 404 may correspond to base station 102/180 and, accordingly, the cell may include a geographic coverage area 110 in which communication coverage is provided and/or small cell 102' having a coverage area 110'. Further, a UE 402 may correspond to at least UE 104. In another example, in the context of FIG. 3, the base station 404 may correspond to base station 310 and the UE 402 may correspond to UE 350.

As illustrated at 410, the base station 404 may configure a dormancy state configuration of an SCell associated with the base station. In some aspects, the dormancy state configuration may be configured via radio resource control (RRC) signaling or media access control (MAC) control element (CE) (MAC-CE). In some aspects, the dormancy state configuration may be comprised within downlink control information (DCI). Extra bits within the DCI may be configured to enable the dormancy state. For example, the dormancy state configuration may be comprised within a non-fallback DCI within a discontinuous reception (DRX) active time. In another example, the dormancy state configuration may be comprised within a wake up signal (WUS) DCI outside of a DRX active time. In some aspects, if there are multiple SCells with dormancy behavior, then the positioning for each cell may be independently controlled. In some aspects, the dormancy state configuration may comprise a plurality of positioning measurement configurations. The dormancy state configuration may comprise a first dormancy state configuration directed to cells in a non-dormant state, and a second dormancy state configuration directed to cells in the dormant state.

As illustrated at 411, the LMF 405 may provide the dormancy state configuration to the base station 404. The base station 404 may receive the dormancy state configuration from the LMF 405. The dormancy state configuration may be for at least one SCell associated with the base station.

As illustrated at 412, the base station 404 may transmit the dormancy state configuration. The base station may transmit the dormancy state configuration to the UE 402. The UE 402 may receive the dormancy state configuration from the base station 404. The dormancy state configuration may configure the UE to measure downlink positioning measurements associated with at least one frequency corresponding to the SCell 406 in a dormant state. In some aspects, the downlink positioning measurements may comprise at least one of downlink time difference of arrival or downlink angle of departure. In some aspects, the dormancy state configuration may indicate whether the downlink positioning measurements of the SCell 406 are allowed while the SCell is in the dormant state.

As illustrated at 414, the UE 402 may measure downlink positioning measurements associated with at least one frequency corresponding to the SCell 406 in a dormant state. The UE 402 may measure downlink positioning measurements associated with at least one frequency corresponding to the SCell 406 in the dormant state based on the dormancy state configuration. The UE may be configured to support downlink only positioning measurements for the SCell in the dormant state. The UE may be configured with downlink only methods. In some aspects, the downlink positioning measurements may comprise at least one of downlink time difference of arrival or downlink angle of departure. In some aspects, both UE assisted and UE based methods may be supported. Measurements in UE assisted mode may be transmitted on the PCell or the PSCell. In some aspects, the dormancy state configuration may indicate whether the measuring of the downlink positioning measurements of the SCell are allowed while the SCell is in the dormant state. For example, the base station 404 may instruct the UE 402, via the dormancy state configuration, to stop measuring downlink positioning measurements to allow the SCell 406 to be fully dormant or to be shut off once the SCell has entered the dormant state.

As illustrated at 416, the UE 402 may measure downlink positioning measurements. The UE 402 may measure downlink positioning measurements associated with at least one frequency corresponding to at least one active cell 408 associated with the base station 404. In some aspects, the at least one active cell 408 may comprise a primary cell (PCell) or a primary secondary cell (PSCell).

As illustrated at 418, the UE 402 may report the downlink positioning measurements of the SCell 406 in the dormant state. The UE 402 may report the downlink positioning measurements of the SCell 406 in the dormant state to an active cell 408 associated with the base station 404. In some aspects, the active cell 408 associated with the base station 404 may comprise at least one of a PCell, a PSCell, or another SCell. The UE may be configured to support downlink and uplink positioning measurements where downlink measurements are performed on the dormant SCell while uplink measurements are supported on the non-dormant SCell (e.g., PCell, PSCell, or another active SCell). In some instances, such as for downlink positioning measurements, the UE may conduct the downlink positioning measurements without a measurement gap configuration in the dormant state. In some instances, on-demand positioning measurements may not be supported via an indication on the SCell, due in part to PDCCH not being monitored or cross-carrier scheduling not supported. The transition from a non-dormant state to a dormant state may be allowed without any change in the positioning configuration and without any interruption to the positioning session. In some instances, a priority of downlink positioning measurements versus CSI-RS measurements may be used to deal with collision scenarios. This priority may be reserved for the dormant state and may change when the cell becomes active. The priority may be defined within the dormancy state configuration provided by the base station.

As illustrated at 420, the base station 404 may transmit a dormancy change indication. The base station 404 may transmit the dormancy change indication to the UE 402. The UE 402 may receive the dormancy change indication from the base station 404. The dormancy change indication may indicate that the SCell 406 has changed between an active state and the dormant state. In some aspects, the UE 402 may switch between the first dormancy state configuration and the second dormancy state configuration, such that the downlink positioning measurements may be based on the first dormancy state configuration or the second dormancy state configuration in response to receipt of the dormancy change indication from the base station 404. In some aspects, the UE 402 may switch automatically between the first and second dormancy state configuration in response to receipt of the dormancy change indication. The first dormancy state configuration may be directed to cells in a non-dormant state (e.g., active cell 408). For example, cells in the non-dormant state may be in an active state. The first dormancy state configuration may configure the UE 402 to measure a certain amount of downlink positioning measurements at a given rate or within a given period of time. The second dormancy state configuration may be directed to cells in the dormant state (e.g., SCell 406). The second dormancy state configuration may configure the UE 402 to measure a reduced amount of downlink positioning measurements in comparison to the first dormancy state configuration. For example, the second dormancy state configuration may configure the UE 402 to measure a subset of downlink positioning measurements that may be configured within the first dormancy state configuration. In some aspects, the second dormancy state configuration may configure the UE 402 to measure downlink positioning measurements at a reduced rate or within an increased period of time.

As illustrated at 422, the base station 404 may transmit an indication when the UE 402 has transitioned to the SCell 406 in the dormant state. The base station 404 may transmit the indication indicating that the UE 402 has transitioned to the SCell 406 in the dormant state to the LMF 405. The LMF may take appropriate actions based on whether the UE is on a cell that is active or in a dormant state. For example, the LMF may receive a different set of measurements when the UE has transitioned to an SCell in the dormant state.

Figure 5:
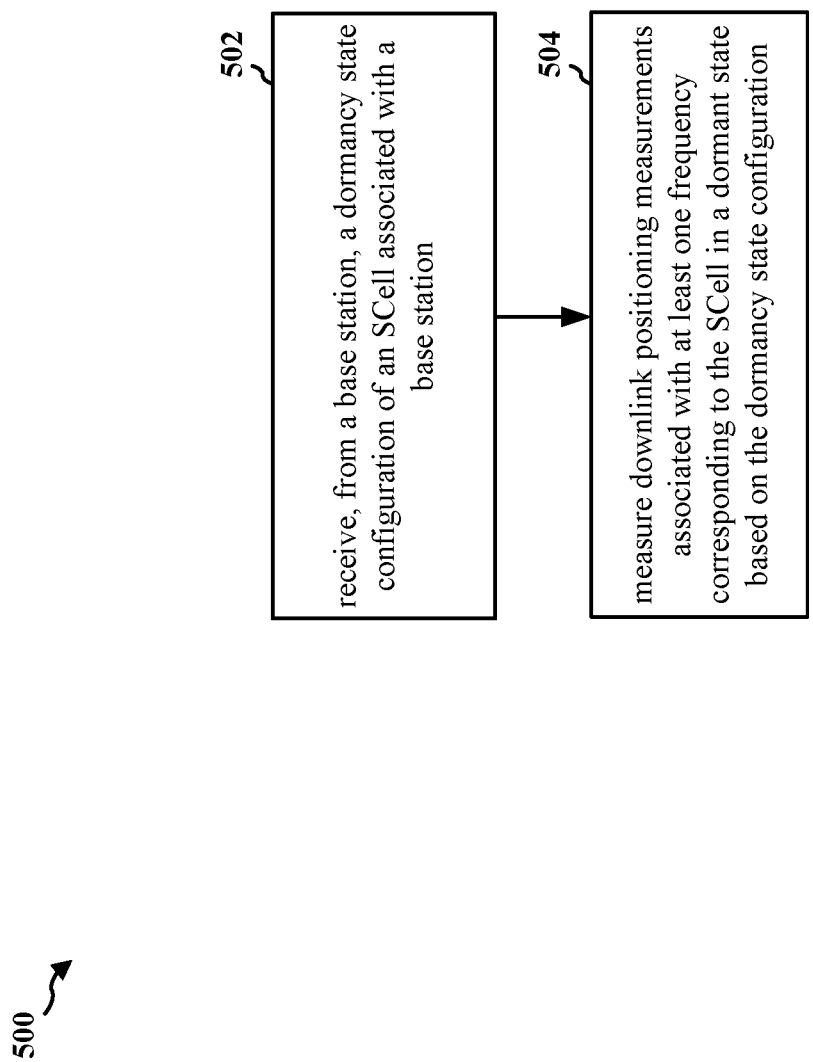
FIG. 5 is a flowchart of a method of wireless communication.

FIG. 5 is a flowchart 500 of a method of wireless communication. The method may be performed by a UE or a component of a UE (e.g., the UE 104; the apparatus 702; the cellular baseband processor 704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure a UE to monitor for positioning reference signals from a cell in a dormant state.

At 502, the UE may receive a dormancy state configuration of an SCell associated with a base station. For example, 502 may be performed by configuration component 740 of apparatus 702. The UE may receive the dormancy state configuration of the SCell from the base station. In some aspects, the dormancy state configuration may be configured via RRC signaling or MAC-CE. In some aspects, the dormancy state configuration may be comprised within DCI. For example, the dormancy state configuration may be comprised within a non-fallback DCI within a DRX active time. In another example, the dormancy state configuration may be comprised within a WUS DCI outside of a DRX active time. In some aspects, such as multiple SCells with dormancy behavior, then the positioning measurements of each SCell may be independently controlled. In some aspects, the dormancy state configuration may comprise a plurality of positioning measurement configurations. For example, the dormancy state configuration may comprise a first dormancy state configuration directed to cells in a non-dormant state, and a second dormancy state configuration directed to cells in the dormant state.

At 504, the UE may measure downlink positioning measurements associated with at least one frequency corresponding to the SCell in a dormant state. For example, 504 may be performed by measurement component 742 of apparatus 702. The UE may measure downlink positioning measurements associated with at least one frequency corresponding to the SCell in the dormant state based on the dormancy state configuration. In some aspects, the downlink positioning measurements may comprise at least one of downlink time difference of arrival or downlink angle of departure. In some aspects, the dormancy state configuration may indicate whether the measuring of the downlink positioning measurements of the SCell are allowed while the SCell is in the dormant state. For example, the base station may instruct the UE, via the dormancy state configuration, to stop measuring downlink positioning measurements to allow the SCell to be fully dormant or to be shut off once the SCell has entered the dormant state.

Figure 6:
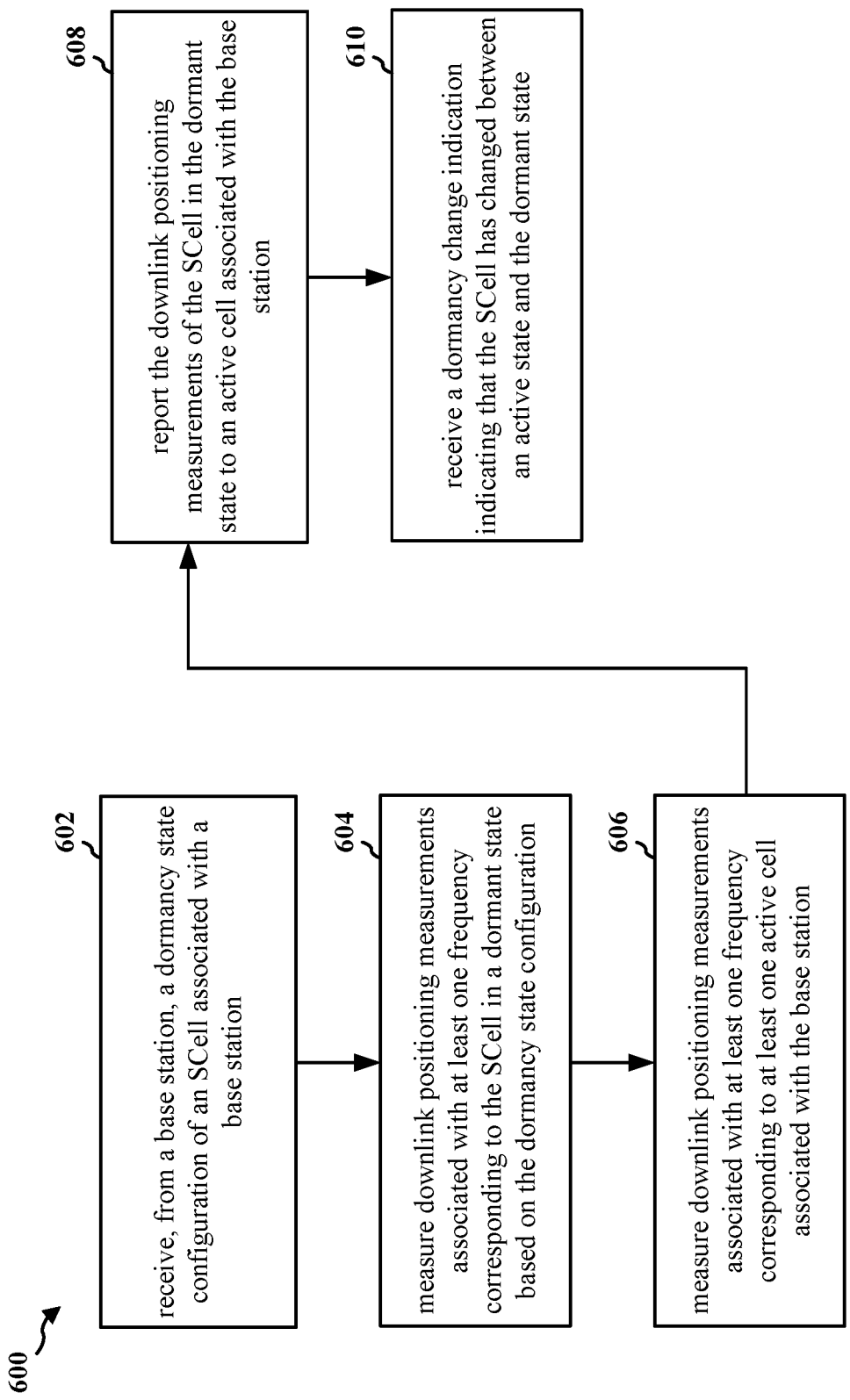
FIG. 6 is a flowchart of a method of wireless communication.

FIG. 6 is a flowchart 600 of a method of wireless communication. The method may be performed by a UE or a component of a UE (e.g., the UE 104; the apparatus 702; the cellular baseband processor 704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to monitor for positioning reference signals from a cell in a dormant state.

At 602, the UE may receive a dormancy state configuration of an SCell associated with a base station. For example, 602 may be performed by configuration component 740 of apparatus 702. The UE may receive the dormancy state configuration of the SCell from the base station. In some aspects, the dormancy state configuration may be configured via RRC signaling or MAC-CE. In some aspects, the dormancy state configuration may be comprised within DCI. For example, the dormancy state configuration may be comprised within a non-fallback DCI within a DRX active time. In another example, the dormancy state configuration may be comprised within a WUS DCI outside of a DRX active time. In some aspects, such as multiple SCells with dormancy behavior, then the positioning measurements of each SCell may be independently controlled. In some aspects, the dormancy state configuration may comprise a plurality of positioning measurement configurations. For example, the dormancy state configuration may comprise a first dormancy state configuration directed to cells in a non-dormant state, and a second dormancy state configuration directed to cells in the dormant state.

At 604, the UE may measure downlink positioning measurements associated with at least one frequency corresponding to the SCell in a dormant state. For example, 604 may be performed by measurement component 742 of apparatus 702. The UE may measure downlink positioning measurements associated with at least one frequency corresponding to the SCell in the dormant state based on the dormancy state configuration. In some aspects, the downlink positioning measurements may comprise at least one of downlink time difference of arrival or downlink angle of departure. In some aspects, the dormancy state configuration may indicate whether the measuring of the downlink positioning measurements of the SCell are allowed while the SCell is in the dormant state. For example, the base station may instruct the UE, via the dormancy state configuration, to stop measuring downlink positioning measurements to allow the SCell to be fully dormant or to be shut off once the SCell has entered the dormant state.

At 606, the UE may measure downlink positioning measurements. For example, 606 may be performed by measurement component 742 of apparatus 702. The UE may measure downlink positioning measurements associated with at least one frequency corresponding to at least one active cell associated with the base station. In some aspects, the at least one active cell may comprise a PCell or a PSCell.

At 608, the UE may report the downlink positioning measurements of the SCell in the dormant state. For example, 608 may be performed by report component 744 of apparatus 702. The UE may report the downlink positioning measurements of the SCell in the dormant state to an active cell associated with the base station. In some aspects, the active cell associated with the base station may comprise at least one of a PCell, a PSCell, or another SCell.

At 610, the UE may receive a dormancy change indication. For example, 610 may be performed by indication component 746 of apparatus 702. The UE may receive the dormancy change indication from the base station. The dormancy change indication may indicate that the SCell has changed between an active state and the dormant state. In some aspects, the UE may switch between the first dormancy state configuration and the second dormancy state configuration, such that the downlink positioning measurements may be based on the first dormancy state configuration or the second dormancy state configuration in response to receipt of the dormancy change indication. In some aspects, the UE may switch automatically between the first and second dormancy state configuration in response to receipt of the dormancy change indication. The first dormancy state configuration may be directed to cells in a non-dormant state. For example, cells in the non-dormant state may be in an active state. The first dormancy state configuration may configure the UE to measure a certain amount of downlink positioning measurements at a given rate or within a given period of time. The second dormancy state configuration may be directed to cells in the dormant state. The second dormancy state configuration may configure the UE to measure a reduced amount of downlink positioning measurements in comparison to the first dormancy state configuration. For example, the second dormancy state configuration may configure the UE to measure a subset of downlink positioning measurements that may be configured within the first dormancy state configuration. In some aspects, the second dormancy state configuration may configure the UE to measure downlink positioning measurements at a reduced rate or within an increased period of time.

Figure 7:
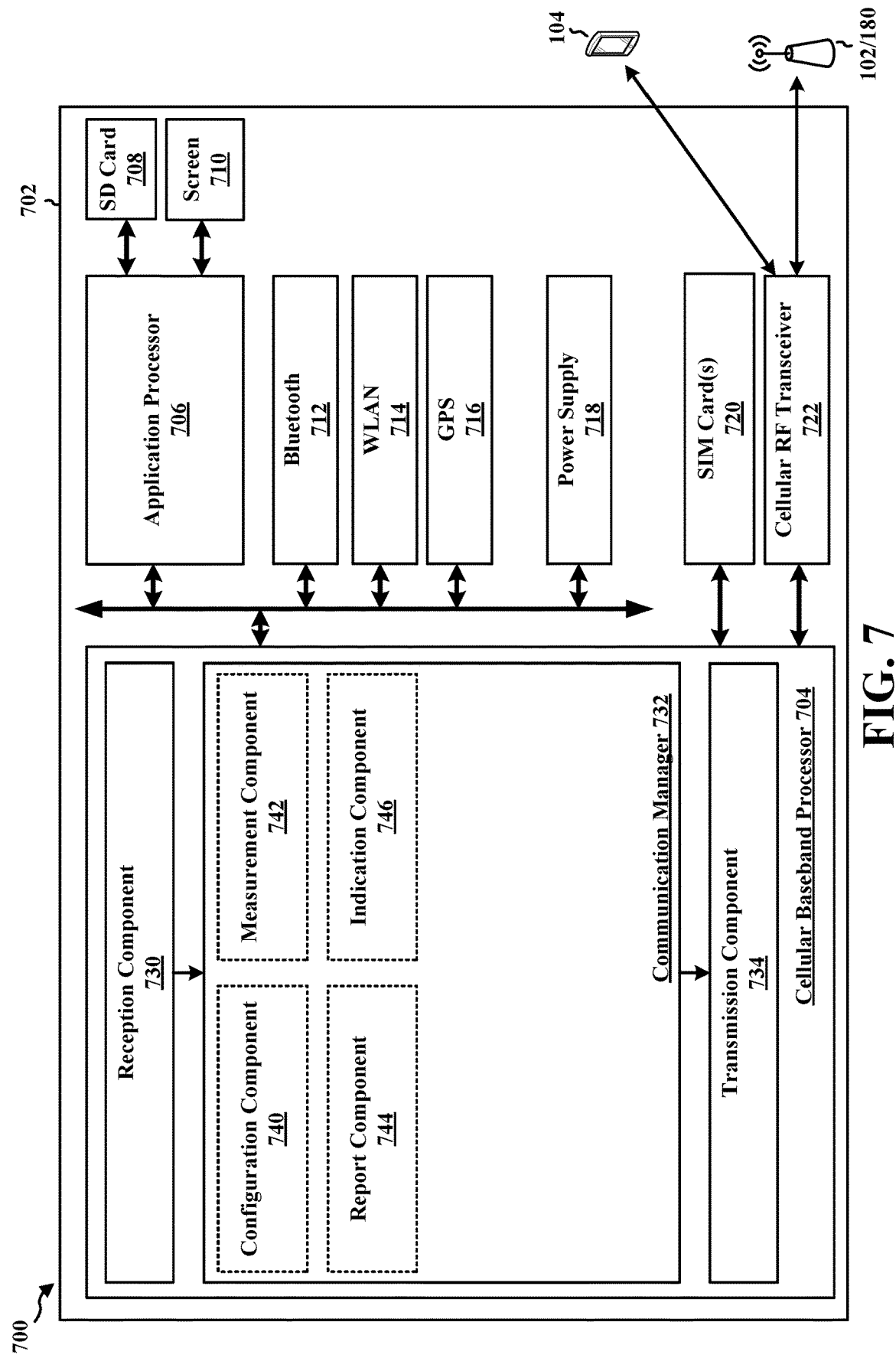
FIG. 7 is a diagram illustrating an example of a hardware implementation for an example apparatus.

FIG. 7 is a diagram 700 illustrating an example of a hardware implementation for an apparatus 702. The apparatus 702 may be a UE, a component of a UE, or may implement UE functionality. In some aspects, the apparatus 702 may include a cellular baseband processor 704 (also referred to as a modem) coupled to a cellular RF transceiver 722. In some aspects, the apparatus 702 may further include one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, or a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the additional modules of the apparatus 702.

The communication manager 732 includes a configuration component 740 that is configured to receive a dormancy state configuration of an SCell associated with a base station, e.g., as described in connection with 502 of FIG. 5 or 602 of FIG. 6. The communication manager 732 further includes a measurement component 742 that is configured to measure downlink positioning measurements associated with at least one frequency corresponding to the SCell in a dormant state, e.g., as described in connection with 504 of FIG. 5 or 604 of FIG. 6. The measurement component 742 may be further configured to measure downlink positioning measurements of an active cell, e.g., as described in connection with 606 of FIG. 6. The communication manager 732 further includes a report component 744 that is configured to report the downlink positioning measurements of the SCell in the dormant state, e.g., as described in connection with 608 of FIG. 6. The communication manager 732 further includes an indication component 746 that is configured to receive a dormancy change indication, e.g., as described in connection with 610 of FIG. 6.

The apparatus may include additional components that perform each of the blocks of the algorithm in the flowcharts of FIGS. 5 and 6. As such, each block in the flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 702 may include a variety of components configured for various functions. In one configuration, the apparatus 702, and in particular the cellular baseband processor 704, includes means for receiving, from a base station, a dormancy state configuration of an SCell associated with a base station. The apparatus includes means for measuring downlink positioning measurements associated with at least one frequency corresponding to the SCell in a dormant state based on the dormancy state configuration. The apparatus further includes means for measuring downlink positioning measurements associated with at least one frequency corresponding to at least one active cell associated with the base station. The apparatus further includes means for reporting the downlink positioning measurements of the SCell in the dormant state to an active cell associated with the base station. The apparatus further includes means for receiving a dormancy change indication indicating that the SCell has changed between an active state and the dormant state. The apparatus further includes means for switching between the first dormancy state configuration and the second dormancy state configuration in response to receipt of the dormancy change indication. The means may be one or more of the components of the apparatus 702 configured to perform the functions recited by the means. As described supra, the apparatus 702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 8:
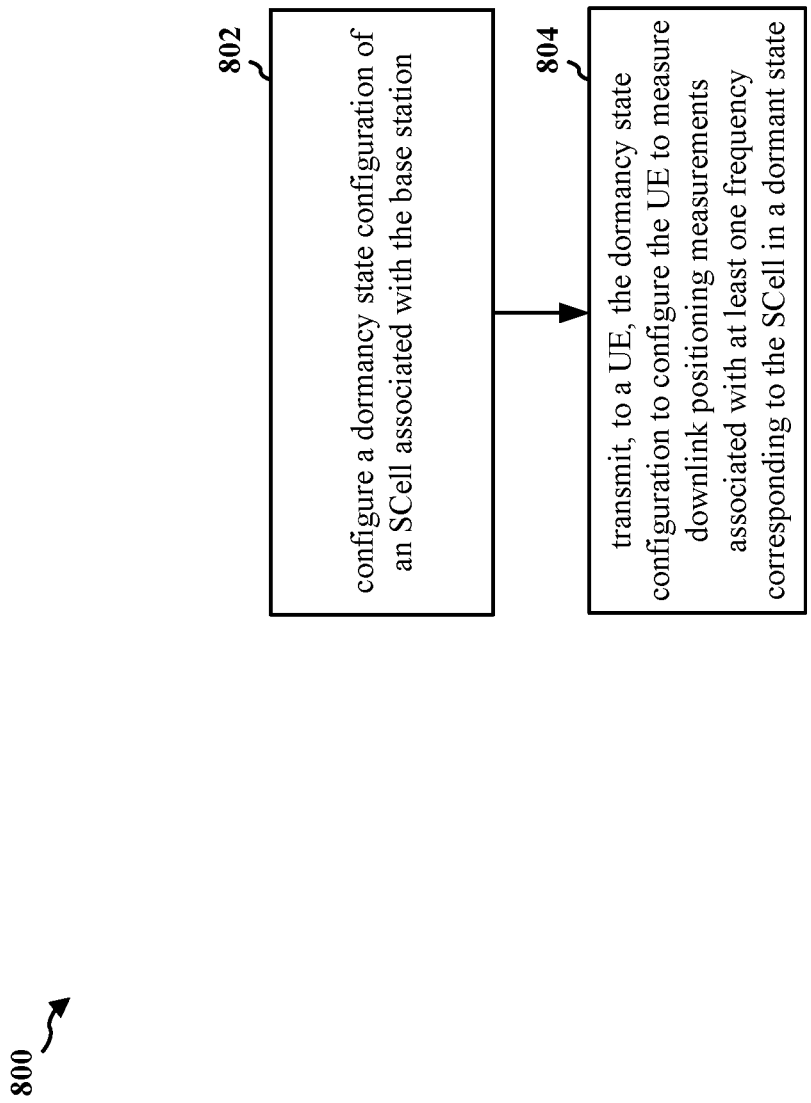
FIG. 8 is a flowchart of a method of wireless communication.

FIG. 8 is a flowchart 800 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to monitor for positioning reference signals from a cell in a dormant state.

At 802, the base station may configure a dormancy state configuration of an SCell associated with the base station. For example, 802 may be performed by configuration component 1140 of apparatus 1102. In some aspects, the dormancy state configuration may be configured via RRC signaling or MAC-CE. In some aspects, the dormancy state configuration may be comprised within DCI. For example, the dormancy state configuration is comprised within a non-fallback DCI within a DRX active time. In another example, the dormancy state configuration may be comprised within a WUS DCI outside of a DRX active time. In some aspects, the dormancy state configuration may comprise a plurality of positioning measurement configurations. The dormancy state configuration may comprise a first dormancy state configuration directed to cells in a non-dormant state, and a second dormancy state configuration directed to cells in the dormant state.

At 804, the base station may transmit the dormancy state configuration. For example, 804 may be performed by configuration component 1140 of apparatus 1102. The base station may transmit the dormancy state configuration to the UE. The dormancy state configuration may configure the UE to measure downlink positioning measurements associated with at least one frequency corresponding to the SCell in a dormant state. In some aspects, the downlink positioning measurements may comprise at least one of downlink time difference of arrival or downlink angle of departure. In some aspects, the dormancy state configuration may indicate whether the downlink positioning measurements of the SCell are allowed while the SCell is in the dormant state.

Figure 9:
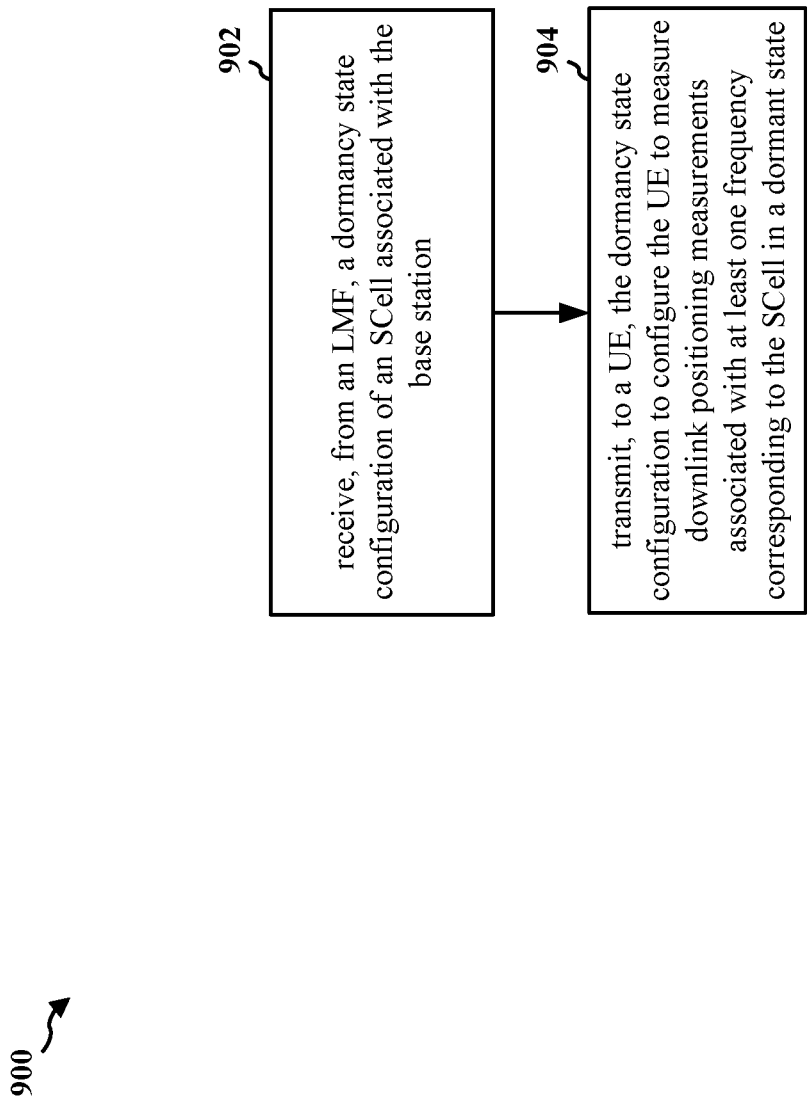
FIG. 9 is a flowchart of a method of wireless communication.

FIG. 9 is a flowchart 900 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to monitor for positioning reference signals from a cell in a dormant state.

At 902, the base station may receive a dormancy state configuration of an SCell associated with the base station. For example, 802 may be performed by configuration component 1140 of apparatus 1102. The base station may receive the dormancy state configuration from an LMF. The LMF may provide the dormancy state configuration to the base station.

At 904, the base station may transmit the dormancy state configuration. For example, 904 may be performed by configuration component 1140 of apparatus 1102. The base station may transmit the dormancy state configuration to the UE. The dormancy state configuration may configure the UE to measure downlink positioning measurements associated with at least one frequency corresponding to the SCell in a dormant state. In some aspects, the downlink positioning measurements may comprise at least one of downlink time difference of arrival or downlink angle of departure. In some aspects, the dormancy state configuration may indicate whether the downlink positioning measurements of the SCell are allowed while the SCell is in the dormant state.

Figure 10:
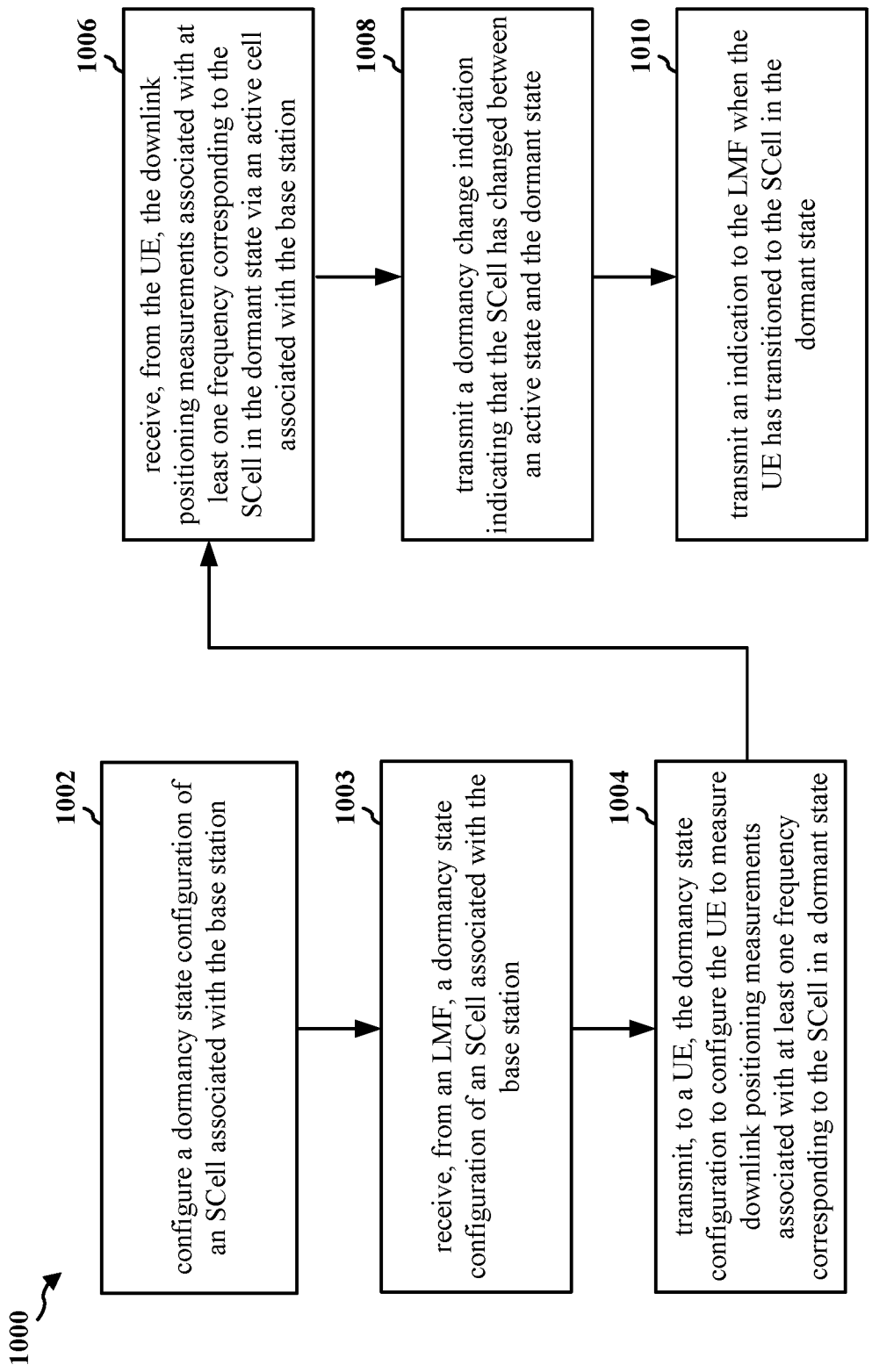
FIG. 10 is a flowchart of a method of wireless communication.

FIG. 10 is a flowchart 1000 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to monitor for positioning reference signals from a cell in a dormant state.

At 1002, the base station may configure a dormancy state configuration of an SCell associated with the base station. For example, 1002 may be performed by configuration component 1140 of apparatus 1102. In some aspects, the dormancy state configuration may be configured via RRC signaling or MAC-CE. In some aspects, the dormancy state configuration may be comprised within DCI. For example, the dormancy state configuration is comprised within a non-fallback DCI within a DRX active time. In another example, the dormancy state configuration may be comprised within a WUS DCI outside of a DRX active time. In some aspects, the dormancy state configuration may comprise a plurality of positioning measurement configurations. The dormancy state configuration may comprise a first dormancy state configuration directed to cells in a non-dormant state, and a second dormancy state configuration directed to cells in the dormant state.

At 1004, the base station may transmit the dormancy state configuration. For example, 1004 may be performed by configuration component 1140 of apparatus 1102. The base station may transmit the dormancy state configuration to the UE. The dormancy state configuration may configure the UE to measure downlink positioning measurements associated with at least one frequency corresponding to the SCell in a dormant state. In some aspects, the downlink positioning measurements may comprise at least one of downlink time difference of arrival or downlink angle of departure. In some aspects, the dormancy state configuration may indicate whether the downlink positioning measurements of the SCell are allowed while the SCell is in the dormant state.

At 1006, the base station may receive the downlink positioning measurements. For example, 1006 may be performed by measurement component 1142 of apparatus 1102. The base station may receive the downlink positioning measurements from the UE. The downlink positioning measurements may be associated with at least one frequency corresponding to the SCell in the dormant state. The base station may receive the downlink positioning measurements via an active cell associated with the base station. In some aspects, the active cell associated with the base station may comprise at least one of a PCell, a PSCell, or another SCell.

At 1008, the base station may transmit a dormancy change indication. For example, 1008 may be performed by indication component 1144 of apparatus 1102. The base station may transmit the dormancy change indication to the UE. The dormancy change indication may indicate that the SCell has changed between an active state and the dormant state.

At 1010, the base station may transmit an indication when the UE has transitioned to the SCell in the dormant state. For example, 1010 may be performed by LMF component 1146. The base station may transmit the indication indicating that the UE has transitioned to the SCell in the dormant state to an LMF.

Figure 11:
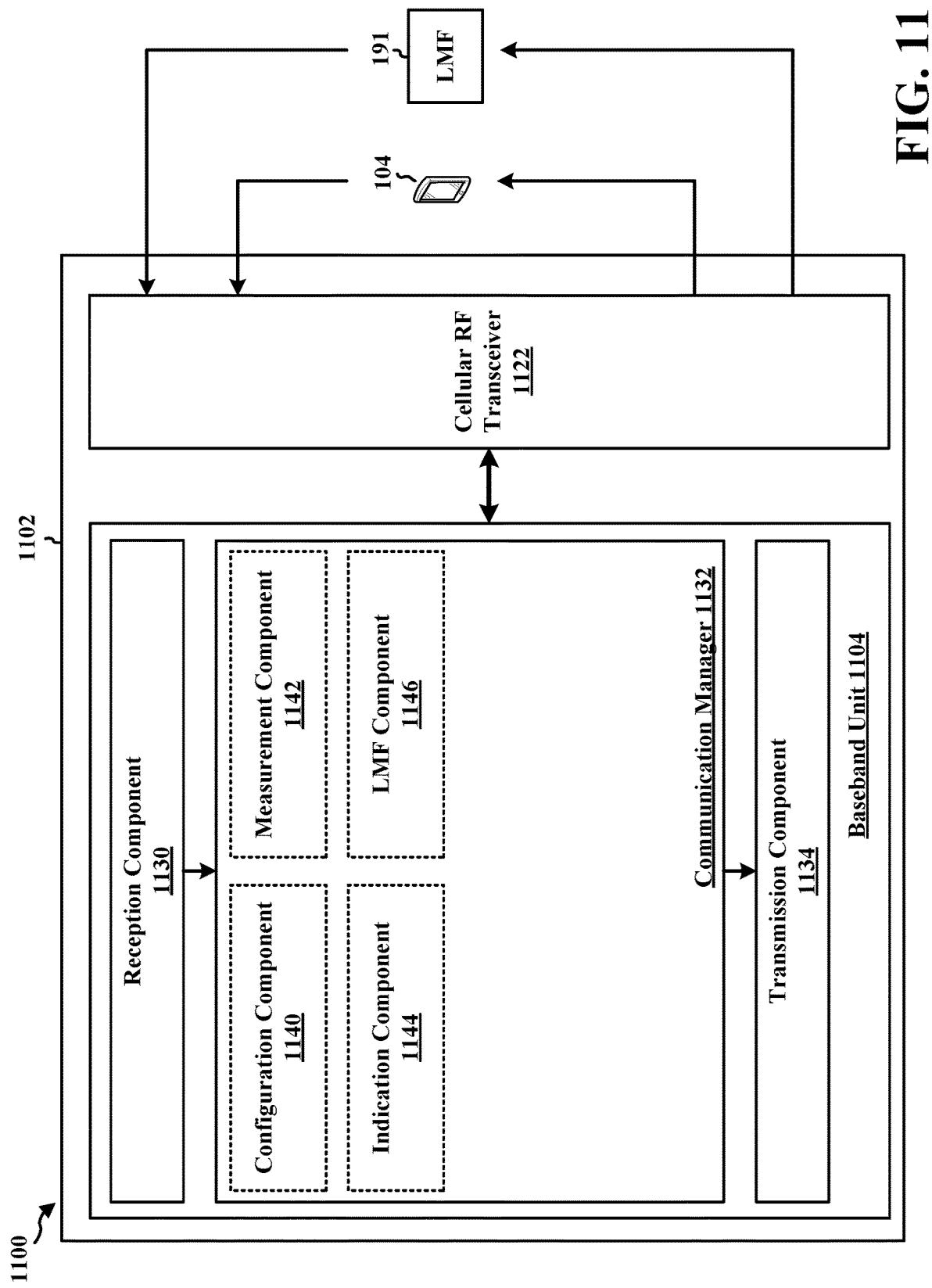
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 114. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a configuration component 1140 that may configure a dormancy state configuration of an SCell associated with the base station, e.g., as described in connection with 802 of FIG. 8 or 1002 of FIG. 10. The configuration component 1140 may be configured to receive, from the LMF, a dormancy state configuration of an SCell associated with the base station, e.g., as described in connection with 902 of FIG. 9. The configuration component 1140 may be configured to transmit the dormancy state configuration, e.g., as described in connection with 804 of FIG. 8, 904 of FIG. 9, or 1004 of FIG. 10. The communication manager 1132 further includes a measurement component 1142 that may receive the downlink positioning measurements, e.g., as described in connection with 1006 of FIG. 10. The communication manager 1132 further includes an indication component 1144 that may transmit a dormancy change indication, e.g., as described in connection with 1008 of FIG. 10. The communication manager 1132 further includes an LMF component 1146 that may transmit an indication when the UE has transitioned to the SCell in the dormant state, e.g., as described in connection with 1010 of FIG. 10.

The apparatus may include additional components that perform each of the blocks of the algorithm in the flowcharts of FIGS. 8, 9, and 10. As such, each block in the flowcharts of FIGS. 8, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for configuring a dormancy state configuration of a SCell associated with the base station. The apparatus includes means for receiving, from an LMF, a dormancy state configuration of an SCell associated with the base station. The apparatus includes means for transmitting, to a UE, the dormancy state configuration to configure the UE to measure downlink positioning measurements associated with at least one frequency corresponding to the SCell in a dormant state. The apparatus further includes means for receiving, from the UE, the downlink positioning measurements associated with at least one frequency corresponding to the SCell in the dormant state via an active cell associated with the base station. The apparatus further includes means for transmitting a dormancy change indication indicating that the SCell has changed between an active state and the dormant state. The apparatus further includes means for transmitting an indication to a LMF when the UE has transitioned to the SCell in the dormant state. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and at least one transceiver and configured to receive, from a base station, a dormancy state configuration of a SCell associated with the base station; and measure downlink positioning measurements associated with at least one frequency corresponding to the SCell in a dormant state based on the dormancy state configuration.

Aspect 2 is the apparatus of aspect 1, further includes that the downlink positioning measurements comprise at least one of downlink time difference of arrival or downlink angle of departure.

Aspect 3 is the apparatus of any of aspects 1 and 2, further includes that the at least one processor is further configured to measure downlink positioning measurements associated with at least one frequency corresponding to at least one active cell associated with the base station.

Aspect 4 is the apparatus of any of aspects 1-3, further includes that the at least one active cell comprises a PCell or a PSCell.

Aspect 5 is the apparatus of any of aspects 1-4, further includes that the at least one processor is further configured to report the downlink positioning measurements of the SCell in the dormant state to an active cell associated with the base station.

Aspect 6 is the apparatus of any of aspects 1-5, further includes that the active cell associated with the base station comprises at least one of a PCell, a PSCell, or another SCell.

Aspect 7 is the apparatus of any of aspects 1-6, further includes that the dormancy state configuration indicates whether the measuring of the downlink positioning measurements of the SCell are allowed while the SCell is in the dormant state.

Aspect 8 is the apparatus of any of aspects 1-7, further includes that the dormancy state configuration is configured via RRC signaling or MAC-CE.

Aspect 9 is the apparatus of any of aspects 1-8, further includes that the dormancy state configuration is comprised within DCI.

Aspect 10 is the apparatus of any of aspects 1-9, further includes that the dormancy state configuration is comprised within a non-fallback DCI within a DRX active time.

Aspect 11 is the apparatus of any of aspects 1-10, further includes that the dormancy state configuration is comprised within a wake up signal (WUS) DCI outside of a discontinuous reception (DRX) active time.

Aspect 12 is the apparatus of any of aspects 1-11, further includes that the dormancy state configuration comprises a plurality of positioning measurement configurations.

Aspect 13 is the apparatus of any of aspects 1-12, further includes that the dormancy state configuration comprises a first dormancy state configuration directed to cells in a non-dormant state, and a second dormancy state configuration directed to cells in the dormant state.

Aspect 14 is the apparatus of any of aspects 1-13, further includes that the at least one processor is further configured to receive a dormancy change indication indicating that the SCell has changed between an active state and the dormant state, wherein the downlink positioning measurements are based on the first dormancy state configuration or the second dormancy state configuration in response to receipt of the dormancy change indication.

Aspect 15 is a method of wireless communication for implementing any of aspects 1-14.

Aspect 16 is an apparatus for wireless communication including means for implementing any of aspects 1-14.

Aspect 17 is a computer-readable medium storing computer executable code, where the code when executed by a processor causes the processor to implement any of aspects 1-14.

Aspect 18 is an apparatus for wireless communication at a base station including at least one processor coupled to a memory and at least one transceiver and configured to configure a dormancy state configuration of a secondary cell (SCell) associated with the base station; and transmit, to a UE, the dormancy state configuration to configure the UE to measure downlink positioning measurements associated with at least one frequency corresponding to the SCell in a dormant state.

Aspect 19 is the apparatus of aspect 18, further includes that the downlink positioning measurements comprise at least one of downlink time difference of arrival or downlink angle of departure.

Aspect 20 is the apparatus of any of aspects 18 and 19, further includes that the at least one processor is further configured to receive, from the UE, the downlink positioning measurements associated with at least one frequency corresponding to the SCell in the dormant state via an active cell associated with the base station.

Aspect 21 is the apparatus of any of aspects 18-20, further includes that the active cell associated with the base station comprises at least one of a PCell, a PSCell, or another SCell.

Aspect 22 is the apparatus of any of aspects 18-21, further includes that the dormancy state configuration indicates whether the downlink positioning measurements of the SCell are allowed while the SCell is in the dormant state.

Aspect 23 is the apparatus of any of aspects 18-22, further includes that the dormancy state configuration is configured via RRC signaling or MAC-CE.

Aspect 24 is the apparatus of any of aspects 18-23, further includes that the dormancy state configuration is comprised within DCI.

Aspect 25 is the apparatus of any of aspects 18-24, further includes that the dormancy state configuration is comprised within a non-fallback DCI within a DRX active time.

Aspect 26 is the apparatus of any of aspects 18-25, further includes that the dormancy state configuration is comprised within a WUS DCI outside of a DRX active time.

Aspect 27 is the apparatus of any of aspects 18-26, further includes that the dormancy state configuration comprises a plurality of positioning measurement configurations, wherein the dormancy state configuration comprises a first dormancy state configuration directed to cells in a non-dormant state, and a second dormancy state configuration directed to cells in the dormant state.

Aspect 28 is the apparatus of any of aspects 18-27, further includes that the at least one processor is further configured to transmit a dormancy change indication indicating that the SCell has changed between an active state and the dormant state.

Aspect 29 is the apparatus of any of aspects 18-28, further includes that the at least one processor is further configured to transmit an indication to a LMF when the UE has transitioned to the SCell in the dormant state.

Aspect 30 is a method of wireless communication for implementing any of aspects 18-29.

Aspect 31 is an apparatus for wireless communication including means for implementing any of aspects 18-29.

Aspect 32 is a computer-readable medium storing computer executable code, where the code when executed by a processor causes the processor to implement any of aspects 18-29.

Aspect 33 is an apparatus for wireless communication at a base station including at least one processor coupled to a memory and at least one transceiver and configured to receive, from an LMF, a dormancy state configuration of a SCell associated with the base station; and transmit, to a UE, the dormancy state configuration received from the LMF to configure the UE to measure downlink positioning measurements associated with at least one frequency corresponding to the SCell in a dormant state.

Aspect 34 is a method of wireless communication for implementing aspect 33.

Aspect 35 is an apparatus for wireless communication including means for implementing aspect 33.

Aspect 36 is a computer-readable medium storing computer executable code, where the code when executed by a processor causes the processor to implement aspect 33.

What is claimed is:

1. An apparatus for wireless communication at a user equipment (UE), comprising:
   memory;
   at least one transceiver; and
   at least one processor, communicatively connected to the memory and the at least one transceiver, the at least one processor configured to:
      receive, from a base station, a dormancy state configuration of a secondary cell (SCell) associated with the base station; and
      measure downlink positioning measurements associated with at least one frequency corresponding to the SCell in a dormant state based on the dormancy state configuration, wherein the downlink positioning measurements comprise at least one of downlink time difference of arrival or downlink angle of departure.

2. The apparatus of claim 1, wherein the at least one processor is further configured to:
   measure downlink positioning measurements associated with at least one frequency corresponding to at least one active cell associated with the base station.

3. The apparatus of claim 2, wherein the at least one active cell comprises a primary cell (PCell) or a primary secondary cell (PSCell).

4. The apparatus of claim 1, wherein the at least one processor is further configured to:
   report the downlink positioning measurements of the SCell in the dormant state to an active cell associated with the base station.

5. The apparatus of claim 4, wherein the active cell associated with the base station comprises at least one of a primary cell (PCell), a primary secondary cell (PSCell), or another SCell.

6. The apparatus of claim 1, wherein the dormancy state configuration indicates whether the measuring of the downlink positioning measurements of the SCell are allowed while the SCell is in the dormant state.

7. The apparatus of claim 1, wherein the dormancy state configuration is configured via radio resource control (RRC) signaling or media access control (MAC) control element (CE) (MAC-CE).

8. The apparatus of claim 1, wherein the dormancy state configuration is comprised within downlink control information (DCI).

9. The apparatus of claim 8, wherein the dormancy state configuration is comprised within a non-fallback DCI within a discontinuous reception (DRX) active time.

10. The apparatus of claim 8, wherein the dormancy state configuration is comprised within a wake up signal (WUS) DCI outside of a discontinuous reception (DRX) active time.

11. The apparatus of claim 1, wherein the dormancy state configuration comprises a plurality of positioning measurement configurations.

12. The apparatus of claim 11, wherein the dormancy state configuration comprises a first dormancy state configuration directed to cells in a non-dormant state, and a second dormancy state configuration directed to cells in the dormant state.

13. The apparatus of claim 12, wherein the at least one processor is further configured to:
    receive a dormancy change indication indicating that the SCell has changed between an active state and the dormant state, wherein the downlink positioning measurements are based on the first dormancy state configuration or the second dormancy state configuration in response to receipt of the dormancy change indication.

14. A method of wireless communication at a user equipment (UE), comprising:
    receiving, from a base station, a dormancy state configuration of a secondary cell (SCell) associated with the base station; and
    measuring downlink positioning measurements associated with at least one frequency corresponding to the SCell in a dormant state based on the dormancy state configuration, wherein the downlink positioning measurements comprise at least one of downlink time difference of arrival or downlink angle of departure.

15. The method of claim 14, further comprising:
    measuring downlink positioning measurements associated with at least one frequency corresponding to at least one active cell associated with the base station.

16. The method of claim 14, further comprising:
    reporting the downlink positioning measurements of the SCell in the dormant state to an active cell associated with the base station.

17. An apparatus for wireless communication at a base station, comprising:
    memory;
    at least one transceiver; and
    at least one processor, communicatively connected to the memory and the at least one transceiver, the at least one processor configured to:
       configure a dormancy state configuration of a secondary cell (SCell) associated with the base station; and
       transmit, to a user equipment (UE), the dormancy state configuration to configure the UE to measure downlink positioning measurements associated with at least one frequency corresponding to the SCell in a dormant state, wherein the downlink positioning measurements comprise at least one of downlink time difference of arrival or downlink angle of departure.

18. The apparatus of claim 17, wherein the at least one processor is further configured to:
    receive, from the UE, the downlink positioning measurements associated with at least one frequency corresponding to the SCell in the dormant state via an active cell associated with the base station.

19. The apparatus of claim 18, wherein the active cell associated with the base station comprises at least one of a primary cell (PCell), a primary secondary cell (PSCell), or another SCell.

20. The apparatus of claim 17, wherein the dormancy state configuration indicates whether the downlink positioning measurements of the SCell are allowed while the SCell is in the dormant state.

21. The apparatus of claim 17, wherein the dormancy state configuration is configured via radio resource control (RRC) signaling or media access control (MAC) control element (CE) (MAC-CE).

22. The apparatus of claim 17, wherein the dormancy state configuration is comprised within downlink control information (DCI).

23. The apparatus of claim 22, wherein the dormancy state configuration is comprised within a non-fallback DCI within a discontinuous reception (DRX) active time.

24. The apparatus of claim 22, wherein the dormancy state configuration is comprised within a wake up signal (WUS) DCI outside of a discontinuous reception (DRX) active time.

25. The apparatus of claim 17, wherein the dormancy state configuration comprises a plurality of positioning measurement configurations, wherein the dormancy state configuration comprises a first dormancy state configuration directed to cells in a non-dormant state, and a second dormancy state configuration directed to cells in the dormant state.

26. The apparatus of claim 25, wherein the at least one processor is further configured to:
   transmit a dormancy change indication indicating that the SCell has changed between an active state and the dormant state.

27. The apparatus of claim 17, wherein the at least one processor is further configured to:
   transmit an indication to a location management function (LMF) when the UE has transitioned to the SCell in the dormant state.

28. An apparatus for wireless communication at a base station, comprising:
   memory;
   at least one transceiver; and
   at least one processor, communicatively connected to the memory and the at least one transceiver, the at least one processor configured to:
      receive, from a location management function (LMF), a dormancy state configuration of a secondary cell (SCell) associated with the base station; and
      transmit, to a user equipment (UE), the dormancy state configuration received from the LMF to configure the UE to measure downlink positioning measurements associated with at least one frequency corresponding to the SCell in a dormant state, wherein the downlink positioning measurements comprise at least one of downlink time difference of arrival or downlink angle of departure.

* * * * *